United States Patent [19]

Kulbersh

[11] Patent Number: 4,715,741

[45] Date of Patent: Dec. 29, 1987

[54] CLIP FOR COUPLING SHELF ASSEMBLIES

[75] Inventor: Irwin Kulbersh, Skokie, Ill.

[73] Assignee: Amco Corporation, Chicago, Ill.

[21] Appl. No.: 887,250

[22] Filed: Jul. 21, 1986

[51] Int. Cl.$^4$ ................................................ A47B 9/00
[52] U.S. Cl. .................................... 403/389; 403/396; 403/399; 403/188; 108/144
[58] Field of Search ............... 403/396, 399, 389, 391, 403/192, 187, 188, 189, 186, 193, 235, 247; 108/106, 108, 144; 211/187, 189, 192, 200

[56] References Cited

U.S. PATENT DOCUMENTS

| | | | |
|---|---|---|---|
| 1,418,699 | 6/1922 | Collins | 403/405.1 X |
| 2,915,275 | 12/1959 | Korka | 403/389 X |
| 3,369,333 | 2/1968 | Wheeler | 403/247 X |
| 3,424,111 | 1/1969 | Maslow | 108/144 |
| 3,523,508 | 8/1970 | Maslow | 108/144 |
| 3,821,872 | 7/1974 | Merloth | 403/398 X |
| 3,902,298 | 9/1975 | Ratliff, Jr. | 403/188 |
| 3,910,001 | 10/1975 | Jackson | 403/391 X |
| 3,973,302 | 8/1976 | Semmerling | 403/387 X |
| 4,079,678 | 3/1978 | Champagne | 108/144 X |
| 4,163,572 | 8/1979 | Benscoter | 403/191 X |
| 4,230,052 | 10/1980 | Champagne | 108/144 |
| 4,261,470 | 4/1981 | Dolan | 403/235 X |
| 4,582,001 | 4/1986 | Leikarts | 108/144 X |

Primary Examiner—Randolph A. Reese
Assistant Examiner—Joseph A. Fischetti
Attorney, Agent, or Firm—Laff, Whitesel, Conte & Saret

[57] ABSTRACT

An inverted U-shaped clip is provided for coupling together shelves on adjacent shelving units. The clip body comprises a pair of spaced-apart parallel sidewalls and a top wall connecting the sidewalls. A first pair of projections extends outwardly from one side of the two sidewalls and each terminates in an upwardly extending hook. With the clip body, the first pair of projections form a first shelf-receiving space. From the opposite side of the clip body, a second pair of projections extends outwardly from the clip, each terminating in an upwardly extending lip. A tongue extends outwardly from the top wall above the second pair of projections and from the same side of the clip body as does the second pair of projections. The tongue terminates in a downwardly extending lip, and with the second pair of projections and the clip body, forms a second shelf-receiving space.

13 Claims, 9 Drawing Figures

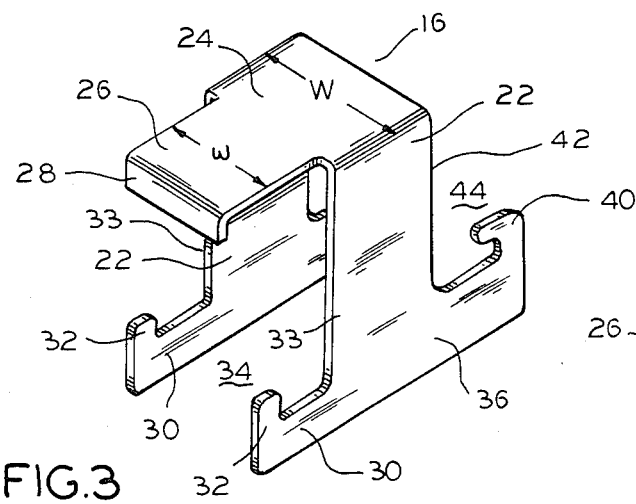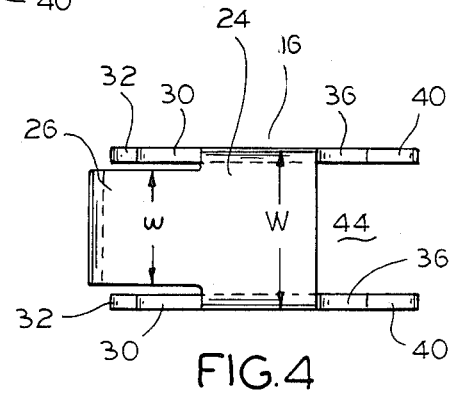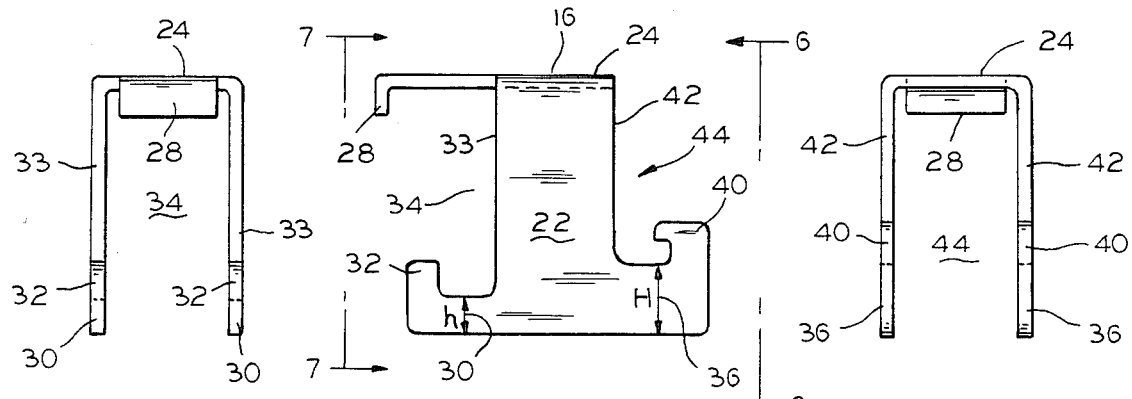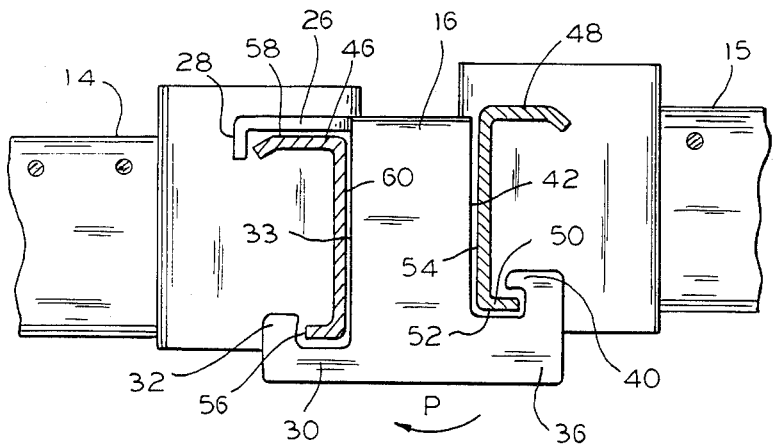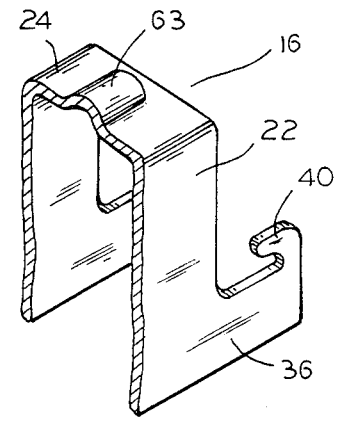

CLIP FOR COUPLING SHELF ASSEMBLIES

FIELD OF THE INVENTION

The present invention relates to a device for connecting or coupling together shelving assemblies to form a shelving system comprising more than one unit. More particularly, the present invention relates to a clip for coupling together shelves at the same level on adjacent shelving assembly units. The design of the clip allows for fast and easy manual installation while providing a secure and stable connection between shelves.

BACKGROUND OF THE INVENTION

Shelving systems comprising a plurality of flat shelves supported by several post members are known in the art. Such systems are often made of metal and are adjustable to vary shelf heights. Individual shelves can be secured to the posts at varying heights to accommodate and support items of various sizes, thus enabling great flexibility as product designs and storage requirements change. An adjustable shelving system has been described in U.S. Pat. Nos. 3,424,111 and 3,523,508.

It is often desirable to connect or couple adjacent shelving assemblies together to eliminate the need for some of the support posts that would otherwise be necessary if the assemblies were not connected. Typically one assembled shelf unit comprises a plurality of flat shelves supported by four posts, a pair of posts at each end of the unit. A second unit is assembled and positioned adjacent the first assembled unit with one end of the second unit supported by two posts. At the other end of the second unit each of the shelves is coupled to and supported by a corresponding shelf on the first unit. To couple adjacent shelves together s-shaped hooks have been commonly used in the art. One loop of the hook is hung over the edge of a shelf on the first assembled unit with the other loop of the hook opened upward to receive and support the edge of the adjacent shelf on the second unit. In this manner, a number of shelving units can be coupled together to form a shelf system.

Although such s-shaped hooks allow for easy manual installation, the shelves supported by the hooks can be inadvertently disengaged by unintentional jarring of the shelves. Such disengagement can result in stored items falling off the shelf and becoming damaged or ruined, and also in injuries to any person in the immediate area struck by the falling items, which are often of substantial weight.

Another limitation of the known s-shaped hooks is that they are of limited strength and may fail if a shelf which they support is too heavily loaded. Because the shelving systems with which the s-hooks are intended to be used are designed to support heavy loads, it is desirable that the s-hooks also be capable of supporting such heavy loads. As with disengagement, failure of the s-hook due to overload could result in damage to property and person.

Accordingly, it is an object of the present invention to provide a means that can easily be installed by hand for coupling together shelves of adjacent shelving assemblies.

Another object of the present invention is to provide a shelf coupling means that can securely couple a pair of shelves so that the shelves will not be inadvertently disengaged.

A further object of the present invention is to provide a shelf coupling means that will not fail when the coupled shelves are fully loaded.

Yet another object of the present invention is to provide a shelf coupling means that is of unitary construction.

Still a further object of the present invention is to provide a shelf coupling means that is economical and efficient to manufacture.

In the preferred embodiment of the invention, an inverted U-shaped clip is provided with shelf receiving spaces on opposite sides. A first shelf receiving space is created on one side of the body of the clip by a pair of outwardly projecting members that each terminate in an upwardly extending hook. On the opposite side of the clip body, a second pair of projections extend outwardly from the clip, each terminating in an upwardly extending lip. From the same side of the clip body, a tongue disposed above the second pair of projections extends outwardly from the clip body to form a second shelf receiving space with the second pair of projections and the clip body. The tongue terminates in a downwardly extending lip.

BRIEF DESCRIPTION OF THE DRAWINGS

FIG. 3 is an isometric view of a first embodiment of the invention.

FIG. 4 is a top plan view of the first embodiment of the invention.

FIG. 5 is a side elevation view of the first embodiment of the invention shown in FIG. 4.

FIG. 6 is an elevation view of the first embodiment of the invention taken along line 6—6 in FIG. 5.

FIG. 7 is an elevation view of the first embodiment of the invention taken along line 7—7 in FIG. 5.

FIG. 8 is an elevation view in partial cross-section showing two shelves coupled together by the first embodiment of the invention.

FIG. 9 is a partial isometric view of a cross-section of a second embodiment of the invention.

DETAILED DESCRIPTION OF THE INVENTION

Figure 1:
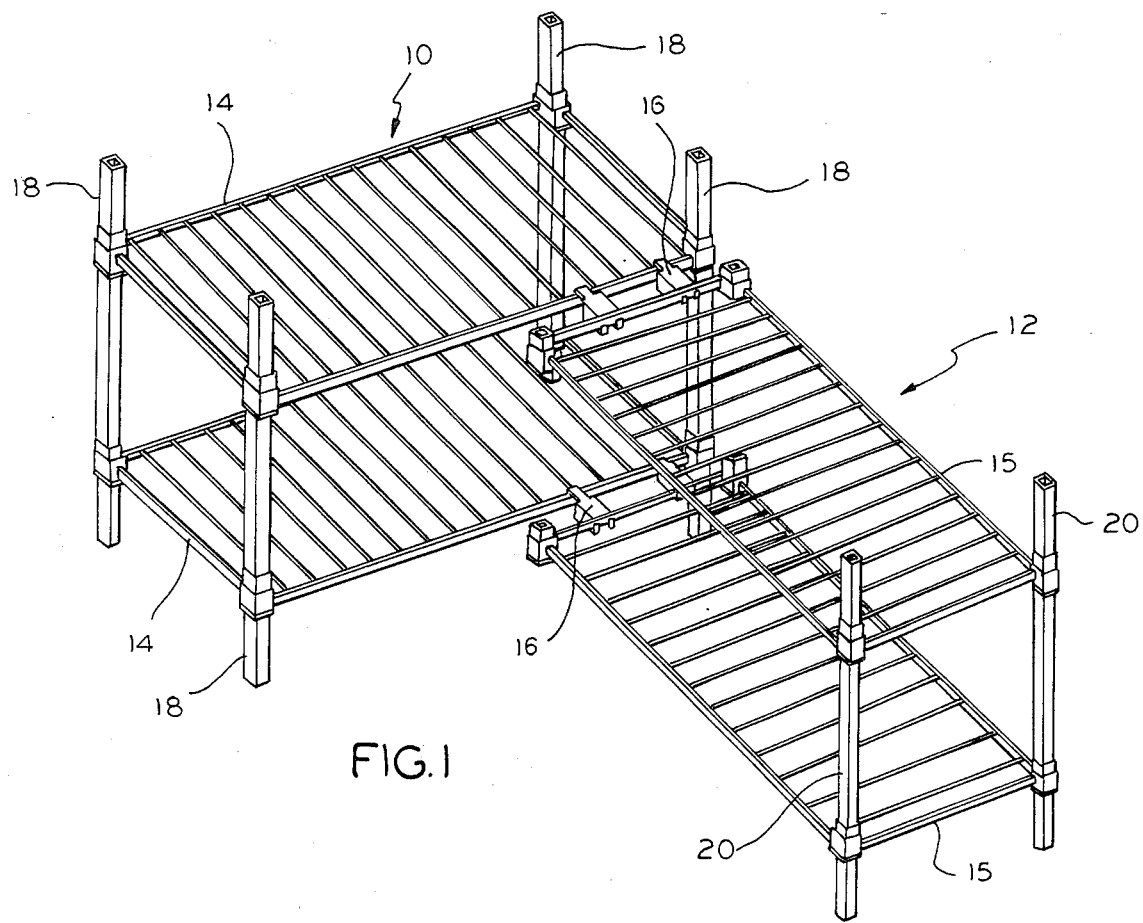
FIG. 1 is an isometric view of two wire shelf assemblies coupled together by means of the invention.

Referring to FIG. 1, shelf assemblies 10 and 12 each comprise a plurality of shelves 14 and 15, respectively, which are coupled together by clips 16, to form a single shelf system. As shown, assembly 10 is supported by four posts 18 at each corner, and assembly 12 is supported by two posts 20 at one end. At the other end of assembly 12, each shelf 15 is coupled to and supported by a corresponding shelf 14 at the same level on assembly 10 by means of clips 16.

Figure 2:
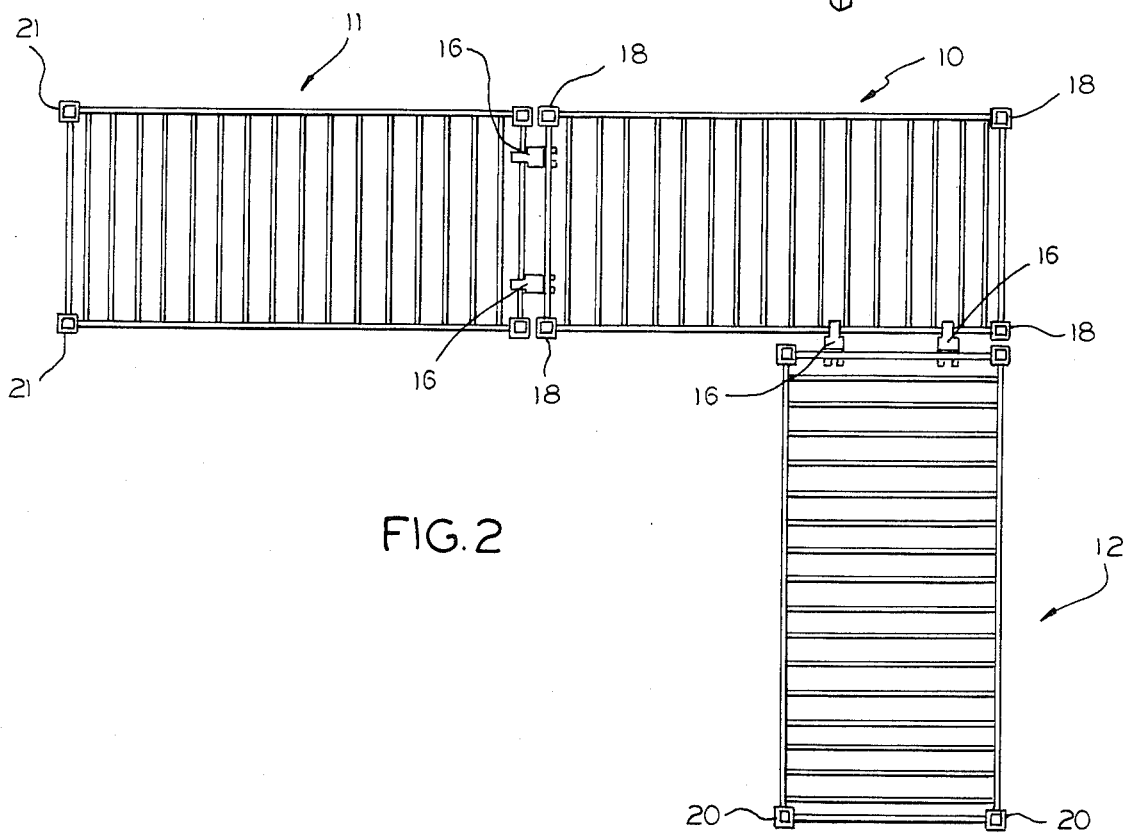
FIG. 2 is a plan view of a typical configuration of shelf assemblies coupled together by means of the invention.

As shown in FIG. 2, shelf assemblies can be coupled together in various configurations. In FIG. 2, a third assembly 11 has been coupled in parallel to assembly 10 to form an L-shaped system with assemblies 10 and 12. Assembly 11 is thus supported by two posts 21 at one end and by assembly 10 at the other end by means of clips 16. In this way three separate shelf assemblies 10, 11 and 12 are supported by only eight posts instead of twelve posts that would normally be required if the assemblies were not coupled together by means of clips 16. Of course, many different configurations comprising various numbers of individual assemblies are possible by using clips 16 and FIG. 2 is intended to represent only one exemplary configuration.

As shown in FIG. 3, clip 16 comprises a pair of parallel and spaced-apart sidewalls 22 integrally connected to a top wall 24, that lies in a plane perpendicular to the plane of the sidewalls. Projecting outwardly from top wall 24, in a plane parallel to the plane of the top wall and perpendicular to the plane of the sidewalls 22, is tongue 26. The width w of tongue 26 is slightly less than the width W of top wall 24, as best seen in FIG. 4. A lip 28 extends downwardly from the outer edge of tongue 26.

Projections 30 are integral with sidewalls 22 and extend outwardly from the bottom of the sidewalls parallel to tongue 26. Lips or flanges 32 extend upwardly from the outer ends of projections 30. Tongue 26 together with projections 30 and sidewall surfaces 33 form a shelf or channel receiving space 34.

Opposite projections 30, support members 36 project outwardly from the bottom of the sidewalls 22. As can best be seen in FIG. 5, height H of members 36 is greater than height h of projections 30. Hooks 40 project upwardly from the outer end of members 36 and together with members 36 and surfaces 42 of sidewalls 22 form a shelf or channel receiving space 44.

To install and use clip 16, the clip is pivoted first onto the channel frame 46 of shelf 14 (FIG. 8). In this operation projections 30 and lips 32 are first placed under and engaged with the bottom of the channel 46. The clip 16 is then pivoted to bring tongue 26 and lip 28 over the top of channel 46, with the channel fitting in space 34.

Typically, as described above, a pair of clips 16 will be placed on each shelf 14 of assembly 10 to support a corresponding shelf 15 on assembly 12. Once the required clips 16 are in place on shelves 14 of assembly 10, the shelves 15 of assembly 12 can then be placed in clips 16. As shown in FIG. 8, the channel frame 48 of shelf 15 is placed in space 44 with hooks 40 engaging a bottom edge 50 of channel 48. The channel 48 is thus supported by members 36 and surfaces 42 of sidewalls 22.

When shelf 15 is loaded, the weight of the shelf and its load will tend to cause clip 16 to pivot about channel 46 in the direction of arrow P as shown in FIG. 8, so that edge 50 of channel 48 will securely engage hooks 40 while channel surfaces 52 and 54 will firmly bear against members 36 and sidewall surfaces 42, respectively. The resulting engagement of the channel 48 with clip 16, particularly by hooks 40, provides an effective means to prevent inadvertent disengagement of shelf 15 from the clip.

This pivoting action causes edge 56 of channel 46 to firmly engage lips 32 while channel surfaces 58 and 60 firmly bear against the underside of tongue 26 and sidewall surfaces 33, respectively. Inadvertent disengagement of clip 16 from channel 46 is thus prevented by projections 30 and lips 32 which will come to bear against the bottom surface 62 of channel 46 if the clip 16 is accidently jarred in an upward direction.

Another embodiment of the clip 16 is shown in FIG. 9 where a gusset 63 is formed in top wall 24. The gusset 63 increases the strength of the top wall 24 and, consequently, the clip as a whole, to resist the torque or bending forces caused by a loaded shelf.

Those who are skilled in the art will readily perceive how to modify the system. Therefore, the appended claims are to be construed to cover all equivalent structures which fall within the true scope and spirit of the invention.

The claimed invention is:

1. A device for coupling together shelves located at the same level in adjacent shelf assemblies comprising two parallel spaced-apart sidewalls; a top wall connected to said sidewalls and disposed in a plane perpendicular to said sidwalls; a tongue extending outwardly from said top wall in a plane parallel to the plane of the top wall; a first pair of projections extending from said sidewalls below and parallel to the direction of extension of said tongue to form with said tongue and said sidewalls a first shelf receiving space, said first shelf receiving space being shaped and proportioned to enable said device to be pivoted into and out of coupling engagement with one of said shelves; and a second pair of projections extending from said sidewalls in a direction opposite to that of said first pair of projections to form with said sidewalls a second shelf receiving space.

2. The coupling device of claim 1 wherein said tongue terminates in a downwardly extending lip.

3. The coupling device of claim 1 wherein each of said first pair of projections terminates in an upwardly extending lip.

4. The coupling device of claim 1 wherein each of said second pair of projections terminates in an upwardly extending hook.

5. The coupling device of claim 1 wherein said device is of unitary construction.

6. The coupling device of claim 1 wherein said device is made from metal.

7. The coupling device of claim 1 including a gusset formed in said top wall.

8. A device for coupling together adjacent shelf assemblies comprising an inverted U-shaped body member, said body member having a first side and a second side opposite said first side; a first pair of projections extending outwardly from the first side of the body member to form a first shelf-receiving space in cooperation with said first side; a second pair of projections extending outwardly from the second side of said body member; and a tongue extending outwardly from said said side of said body member above said second pair of projections to form a second shelf receiving space in cooperation with said second pair of projections and said second side, said second shelf receiving space being shaped and proportioned to enable said device to be pivoted into and out of coupling engagement with one of said shelves.

9. The coupling device of claim 8 wherein said body member comprises a pair of spaced-apart parallel sidewalls connected together by a top wall.

10. The coupling device of claim 9 wherein said first and second pairs of projections extend outwardly from said sidewalls.

11. The coupling device of claim 8 wherein each of said first pair of projections terminates in a hook, each of said second pair of projections terminates in an upwardly extending lip, and said tongue terminates in a downwardly extending lip.

12. The coupling device of claim 9 including a gusset formed in said top wall.

13. The coupling device of claim 8 wherein said device is of unitary construction.

* * * * *